(12) United States Patent
Wurnitsch et al.

(10) Patent No.: US 11,708,425 B2
(45) Date of Patent: Jul. 25, 2023

(54) POLYMERIZATION REACTOR SYSTEM COMPRISING AT LEAST ONE WITHDRAWAL VALVE

(71) Applicant: Borealis AG, Vienna (AT)

(72) Inventors: Christof Wurnitsch, Linz (AT); Sameer Vijay, Linz (AT); Erno Elovainio, Porvoo (FI)

(73) Assignee: BOREALIS AG, Vienna (AT)

( * ) Notice: Subject to any disclaimer, the term of this patent is extended or adjusted under 35 U.S.C. 154(b) by 655 days.

(21) Appl. No.: 16/646,767

(22) PCT Filed: Nov. 2, 2018

(86) PCT No.: PCT/EP2018/080046
§ 371 (c)(1),
(2) Date: Mar. 12, 2020

(87) PCT Pub. No.: WO2019/086623
PCT Pub. Date: May 9, 2019

(65) Prior Publication Data
US 2020/0207879 A1     Jul. 2, 2020

(30) Foreign Application Priority Data

Nov. 3, 2017  (EP) ..................... 17199959

(51) Int. Cl.
*C08F 2/01* (2006.01)
*B01J 4/00* (2006.01)
(Continued)

(52) U.S. Cl.
CPC ............. *C08F 2/01* (2013.01); *B01J 4/001* (2013.01); *B01J 4/008* (2013.01); *B01J 19/1837* (2013.01);
(Continued)

(58) Field of Classification Search
None
See application file for complete search history.

(56) References Cited

U.S. PATENT DOCUMENTS

| | | | |
|---|---|---|---|
| 2003/0109651 A1* | 6/2003 | Kufeld | .................. C08F 210/16 |
| | | | 526/88 |
| 2007/0078237 A1 | 4/2007 | Mcelvain et al. | |
| 2012/0053304 A1 | 3/2012 | Fourage et al. | |

FOREIGN PATENT DOCUMENTS

| | | |
|---|---|---|
| WO | WO 2004/031245 A1 | 4/2004 |
| WO | WO 2006/007974 A1 | 1/2006 |
| WO | WO 2006/026493 A1 | 3/2006 |

OTHER PUBLICATIONS

International Search Report for PCT/EP2018/080046, dated Feb. 12, 2019.

* cited by examiner

*Primary Examiner* — Fred M Teskin
(74) *Attorney, Agent, or Firm* — Lippes Mathias LLP

(57) ABSTRACT

Described herein is a polymerization reactor system comprising at least one loop reactor and/or at least one transfer line, and further comprising at least one withdrawal valve, wherein the at least one withdrawal valve is mounted to a wall of a lower horizontal segment of the loop reactor and/or to a wall of the transfer line, at an angle a of more than 0° and equal to or less than 85°, determined from perpendicular to a tangent of the wall at the mounting position in flow direction of a slurry in the loop reactor and/or in the transfer line. The valve piston of the at least one withdrawal valve comprises a valve plate at an end directed to the at least one loop reactor and/or at an end directed to the at least one transfer line, the valve plate being shaped according to an inner wall of the at least one loop reactor and/or according to an inner wall of the at least one transfer line such that the (Continued)

Figure 1:
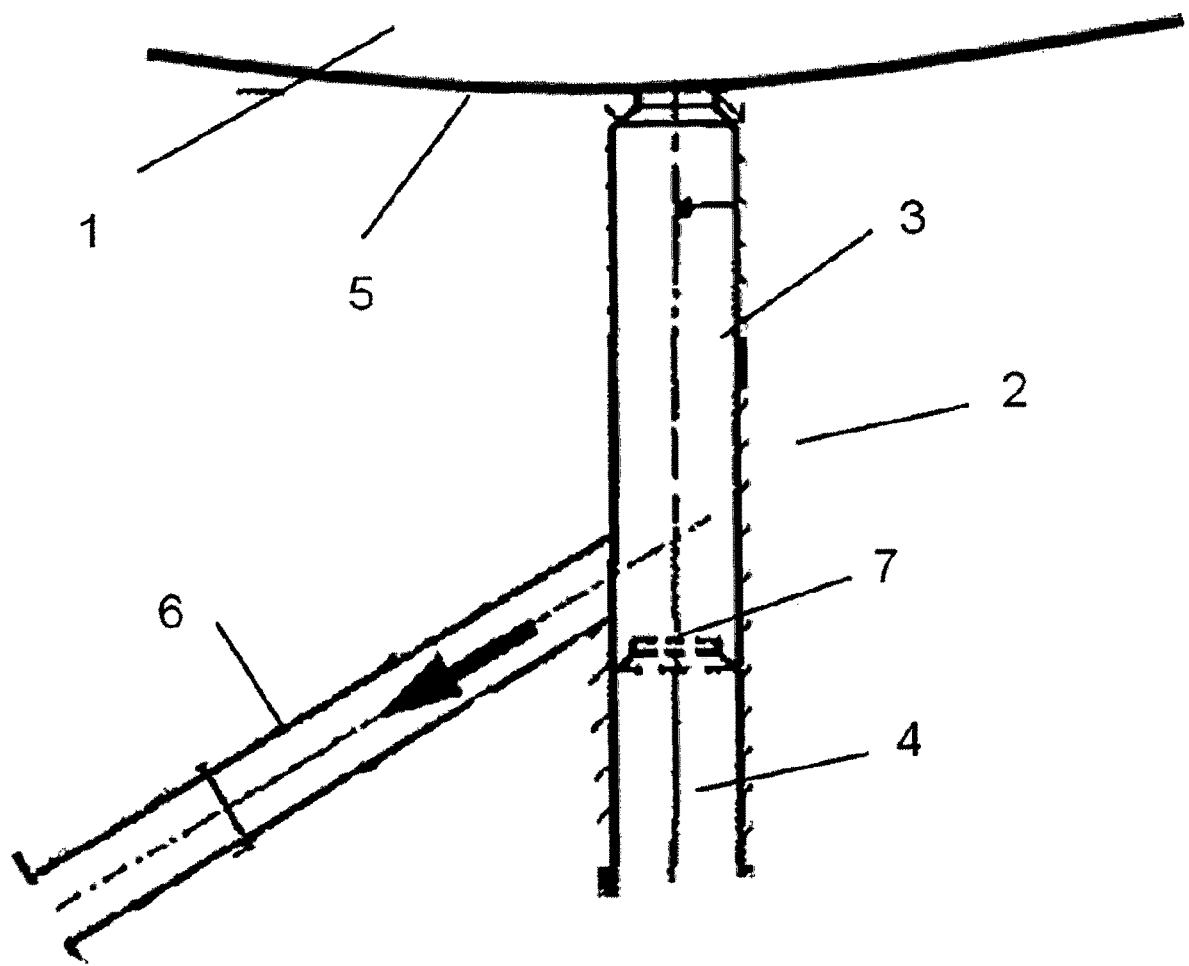

valve piston is flush with the inner wall of the at least one loop reactor and/or with the inner wall of the at least one transfer line in a closed position of the withdrawal valve. By using such a withdrawal valve, a limitation of the effective withdrawal area can be avoided or at least be reduced such that the liquid slurry can efficiently be withdrawn and the risk of plugging is reduced. Further disclosed is a method for producing an olefin polymer in the inventive polymerization reactor system.

20 Claims, 6 Drawing Sheets

(51) Int. Cl.
*B01J 19/18* (2006.01)
*B01J 19/24* (2006.01)
*C08F 10/00* (2006.01)
(52) U.S. Cl.
CPC ........... *B01J 19/2435* (2013.01); *C08F 10/00* (2013.01); *B01J 2204/005* (2013.01)

POLYMERIZATION REACTOR SYSTEM COMPRISING AT LEAST ONE WITHDRAWAL VALVE

This is a 371 of PCT/EP2018/080046, filed Nov. 2, 2018, which claims priority to European Patent Application No. 17199959.2 filed Nov. 3, 2017, the contents of which are fully incorporated herein by reference.

The present invention relates to a polymerization reactor system comprising at least one loop reactor and/or at least one transfer line, and further comprising at least one withdrawal valve, wherein the at least one withdrawal valve is mounted to a wall of a lower horizontal segment of the at least one loop reactor and/or wherein the at least one withdrawal valve is mounted to a wall of the at least one transfer line. Further disclosed is a method for producing an olefin polymer in the inventive polymerization reactor system and the use of at least one withdrawal valve being mounted to a wall of a lower horizontal segment of a loop reactor and/or being mounted to a wall of a transfer line.

BACKGROUND

One of the main processes for producing olefin polymers, like polyethylene and polypropylene, is a slurry phase reaction in a loop reactor. In the loop reactor, olefin monomers, such as ethylene and/or propylene, and optional comonomer(s) are polymerised in the presence of a hydrocarbon diluent and a suitable polymerization catalyst in a slurry phase at elevated pressure and temperature. Thereby, solid olefin polymer particles are continuously formed and suspended in the liquid phase as the reactants are circulated around the loop reactor in the liquid state.

The resulting polymer slurry including the suspended olefin polymer particles is then withdrawn from the loop reactor for further downstream processing, such as separating and recovering the solid olefin polymer particles. Alternatively, in case of a cascaded polymerisation process, the polymer slurry may be withdrawn from the loop reactor and transferred to the next reaction vessel, such as another loop reactor or a gas phase reactor, via a transfer line. For sampling, polymer slurry including the suspended olefin polymer particles may also be withdrawn from such a transfer line.

Several approaches for the withdrawal of polymer slurry from a loop reactor have been proposed in the art. For instance, EP 1 310 295 A1 discloses a method wherein the polymer slurry is discontinuously withdrawn from a loop reactor using a settling leg. However, the use of a settling leg has the disadvantage that every time it reaches the stage where the accumulated polymer slurry is discharged ("fired") by opening a product take-off valve at the lower end of the settling leg, an interference with the flow of slurry in the loop reactor is caused. The flow velocity of slurry in the loop reactor may be affected thereby and an additional build-up of polymer particles may be caused, which can lead to reactor plugging deteriorating the withdrawal efficiency.

EP 1 437 174 A2 describes an alternative approach for the withdrawal of polymer slurry, wherein a discharge conduit that extends for a distance into the loop reactor and that has portions defining an opening, which faces the direction of flow of the circulating polymer slurry, is used for capturing the polymer slurry. The captured polymer slurry is then discharged continuously or otherwise through a portion of the discharge conduit that extends outwardly from the loop reactor. EP 2 266 692 A1 further defines that a loop reactor may also comprise at least two such discharge conduits, which are located at a specific distance to each other and, preferably, each discharge conduit is located within a separate bottom run in the loop reactor. Since the discharge conduits extend into the loop reactor perpendicular to the flow direction of the polymer slurry, they represent a flow resistance and turbulences in the polymer slurry downstream of the discharge conduits are created, which can contribute to an additional build-up of polymer particles and reactor plugging may be promoted. Additionally, the flow direction of the solid olefin polymer particles in the withdrawn slurry is changed considerably upon withdrawal through the perpendicular discharge conduit such that zones may form within the discharge conduit, where no flow of polymer particles occurs due to inertia effects on the particles. Accordingly, the effective withdrawal area may be reduced limiting the withdrawal efficiency.

Furthermore, valves may be applied for the withdrawal of the polymer slurry. Various types of withdrawal valves like piston or ram valves, ball valves and the like are well known in the art. For instance, EP 1 5478 681 A0 relates to a process using a ball valve directly mounted to the wall of a loop reactor, which is periodically fully closed and fully opened such that the withdrawn slurry is removed from the reactor in a discontinuous manner. The withdrawal efficiency and, thus, the overall throughput of a loop reactor depend from the effective withdrawal area for the polymer slurry. Accordingly, when applying withdrawal valves, the effective withdrawal area may inter alia be influenced by the flow characteristics of the polymer slurry, by the size of the withdrawal valve, by the mounting position of the valve relative to the reactor and by the mounting position of the valve relative to the flow of the slurry. In most current loop reactors, the withdrawal valves are usually mounted to the wall of the reactor perpendicular to the wall in the mounting position (cf. FIG. 1). Hence, the flow direction through the valve is also essentially perpendicular to the flow direction of the polymer slurry in the loop reactor at the mounting position. Consequently, upon withdrawal, the flow direction of the polymer slurry has to change considerably, i.e. about 90°. Due to inertia effects on the solid olefin polymer particles in the polymer slurry, zones may form within the withdrawal valve, where no or almost no polymer slurry is present (cf. FIG. 2). As a result, the effective withdrawal area of the withdrawal valve is limited which affects the withdrawal efficiency and the overall throughput of the loop reactor. Additionally, a limitation of the effective withdrawal area may promote plugging of the withdrawal valve, particularly in case of bigger solid polymer particles in the range of 1 mm and above or chunks thereof, which may cause flow restriction in the withdrawal valve leading to a further build-up of solid polymer particles.

EP 0 891 990 A2 and WO 2011/146334 A1 disclose that a withdrawal valve can be mounted to a lower bend (also denoted as 'elbow') downstream of a corresponding lower horizontal segment of a loop reactor for continuous withdrawal of polymer slurry. Thereby, the withdrawal valve may be attached at an angle deviating from the perpendicular to a tangent on the outside radius of the bend in flow direction of the slurry. For instance, the valve may be attached tangentially to the lower bend. However, in case of a tangential or essentially tangential attachment, substantially no gravity force can be used for the withdrawal of the polymer slurry. Moreover, as turbulences in the flow of the polymer slurry inevitably occur in the vicinity of bends in the loop reactor due to a change in the flow direction, a withdrawal valve mounted to a bend is potentially more prone to plugging due to an additional build-up of polymer particles.

Hence, there is still a need for improved withdrawal means for loop reactors and/or transfer lines, which do not or essentially do not affect the flow of the polymer slurry in the reactor and/or in the transfer line, for instance by creating turbulences, and which allow the efficient withdrawal of the polymer slurry resulting in high throughput at a low risk of plugging.

SUMMARY OF THE INVENTION

The present invention is based on the finding that by mounting at least one withdrawal valve to a wall of a lower horizontal segment of a loop reactor at an specific angle and/or by mounting at least one withdrawal valve to a wall of a transfer line at an specific angle, a limitation of the effective withdrawal area due to inertia effects on the polymer slurry can be avoided or at least be reduced and low flow resistance is obtained upon withdrawal of the polymer slurry, resulting in high efficiency and high throughput at a reduced risk of plugging. Moreover, the flow of polymer slurry in the reactor and/or in the transfer line is not or not essentially affected by the withdrawal of polymer slurry.

Therefore, in one aspect, the present invention relates to a polymerization reactor system comprising at least one loop reactor and/or at least one transfer line, and further comprising at least one withdrawal valve, the at least one withdrawal valve comprising a valve cylinder and a valve piston within the valve cylinder, wherein at least one withdrawal valve is mounted to a wall of a lower horizontal segment of the at least one loop reactor at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one loop reactor; and/or wherein at least one withdrawal valve is mounted to a wall of the at least one transfer line at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one transfer line;

and wherein the valve piston of the at least one withdrawal valve comprises a valve plate at an end directed to the at least one loop reactor, the valve plate being shaped according to an inner wall of the at least one loop reactor such that the valve piston is flush with the inner wall of the at least one loop reactor in a closed position of the withdrawal valve; and/or wherein the valve piston of the at least one withdrawal valve comprises a valve plate at an end directed to the at least one transfer line, the valve plate being shaped according to an inner wall of the at least one transfer line such that the valve piston is flush with the inner wall of the at least one transfer line in a closed position of the withdrawal valve.

In another aspect, the present invention refers to a method for producing an olefin polymer in a polymerization reactor system comprising the steps of supplying at least one olefin monomer, optionally comonomer, diluent and catalyst to at least one loop reactor;

polymerizing the at least one olefin monomer and optionally comonomer to produce a liquid slurry comprising a liquid medium and solid olefin polymer particles;

withdrawing at least a portion of the liquid slurry via at least one withdrawal valve, the at least one withdrawal valve comprising a valve cylinder and a valve piston within the valve cylinder, wherein at least one withdrawal valve is mounted to a wall of a lower horizontal segment of the at least one loop reactor at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one loop reactor; and/or wherein at least one withdrawal valve is mounted to a wall of at least one transfer line at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one transfer line, and wherein the valve piston of the at least one withdrawal valve comprises a valve plate at an end directed to the at least one loop reactor, the valve plate being shaped according to an inner wall of the at least one loop reactor such that the valve piston is flush with the inner wall of the at least one loop reactor in a closed position of the withdrawal valve; and/or wherein the valve piston of the at least one withdrawal valve comprises a valve plate at an end directed to the at least one transfer line, the valve plate being shaped according to an inner wall of the at least one transfer line such that the valve piston is flush with the inner wall of the at least one transfer line in a closed position of the withdrawal valve; and transferring the withdrawn liquid slurry via a withdrawal conduit connected to the at least one withdrawal valve at an angle β of more than 90° and less than 180°, preferably of equal to or more than 110° to equal to or less than 160°, determined from the longitudinal axis of the withdrawal valve in flow direction of the withdrawn slurry.

Further, the present invention refers to the use of at least one withdrawal valve comprising a valve cylinder and a valve piston within the valve cylinder, wherein the at least one withdrawal valve is mounted to a wall of a lower horizontal segment of a loop reactor at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the loop reactor, for increasing the withdrawal efficiency from the at least one loop reactor; and/or wherein the at least one withdrawal valve is mounted to a wall of at least one transfer line at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one transfer line, for increasing the withdrawal efficiency from the at least one transfer line;

and wherein the valve piston of the at least one withdrawal valve comprises a valve plate at an end directed to the at least one loop reactor, the valve plate being shaped according to an inner wall of the at least one loop reactor such that the valve piston is flush with the inner wall of the at least one loop reactor in a closed position of the withdrawal valve; and/or wherein the valve piston of the at least one withdrawal valve comprises a valve plate at an end directed to the at least one transfer line, the valve plate being shaped according to an inner wall of the at least one transfer line such that the valve piston is flush with the inner wall of the at least one transfer line in a closed position of the withdrawal valve.

FIGURES

FIG. 1: Detail of a side view of a loop reactor comprising a withdrawal valve according to the prior art.

Figure 2:
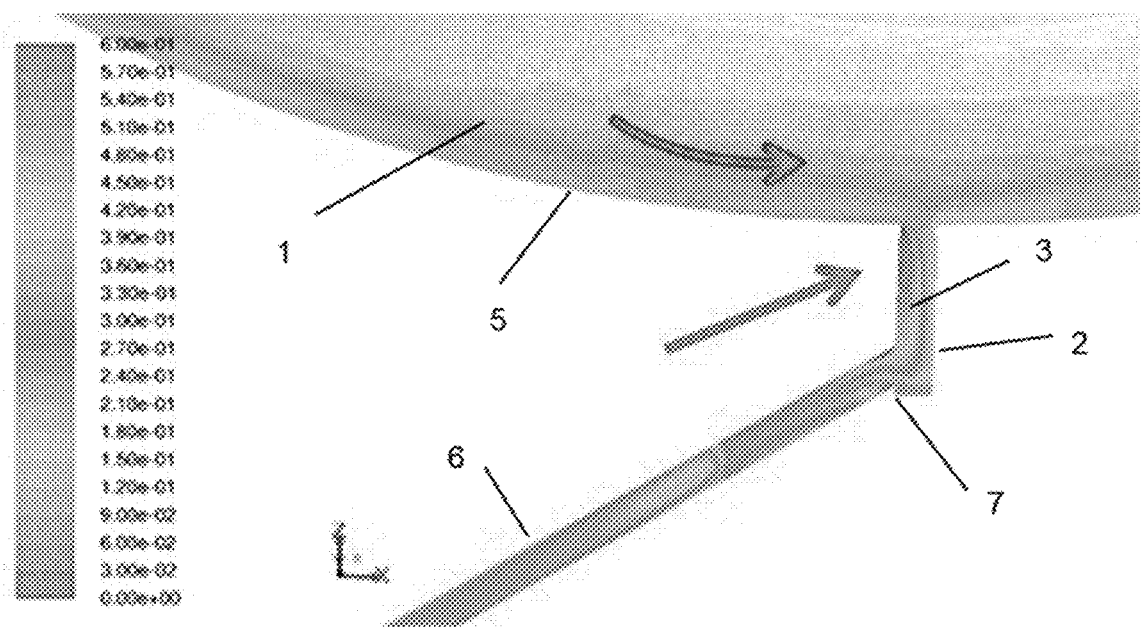

FIG. 2: Solid olefin polymer particle distribution during withdrawal from a loop reactor using a withdrawal valve according the prior art.

Figure 3:
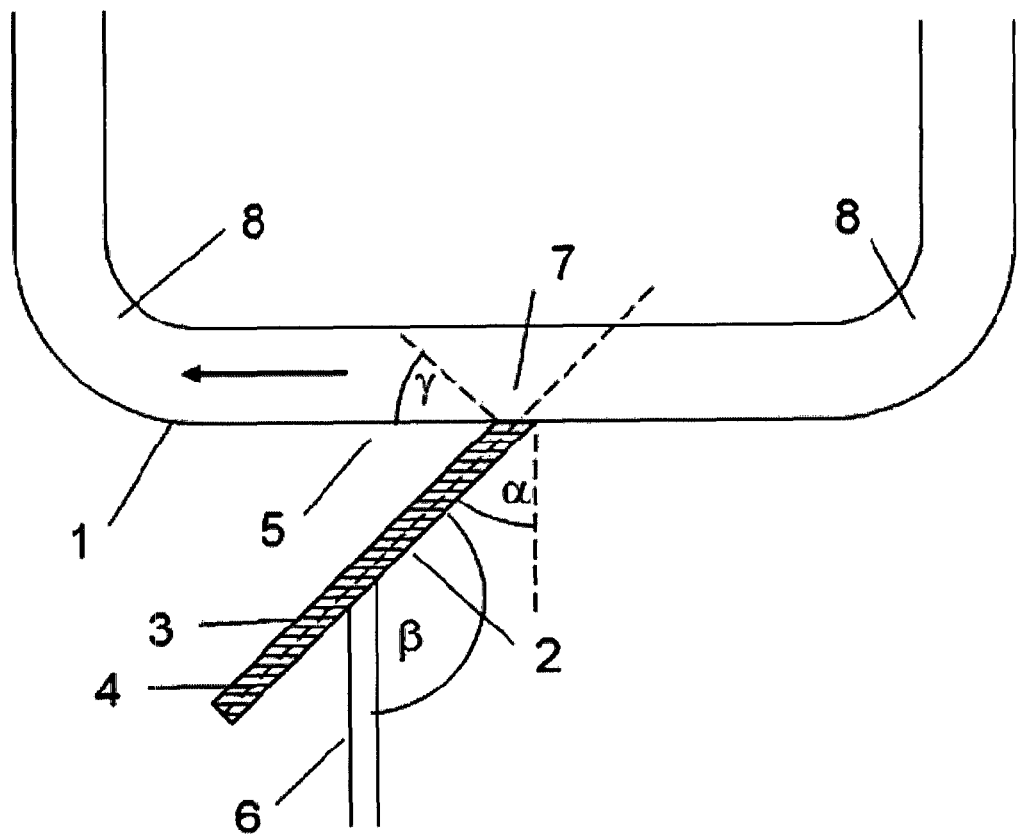

FIG. 3: Detail of a side view of a loop reactor comprising a withdrawal valve according to the invention.

Figure 4:
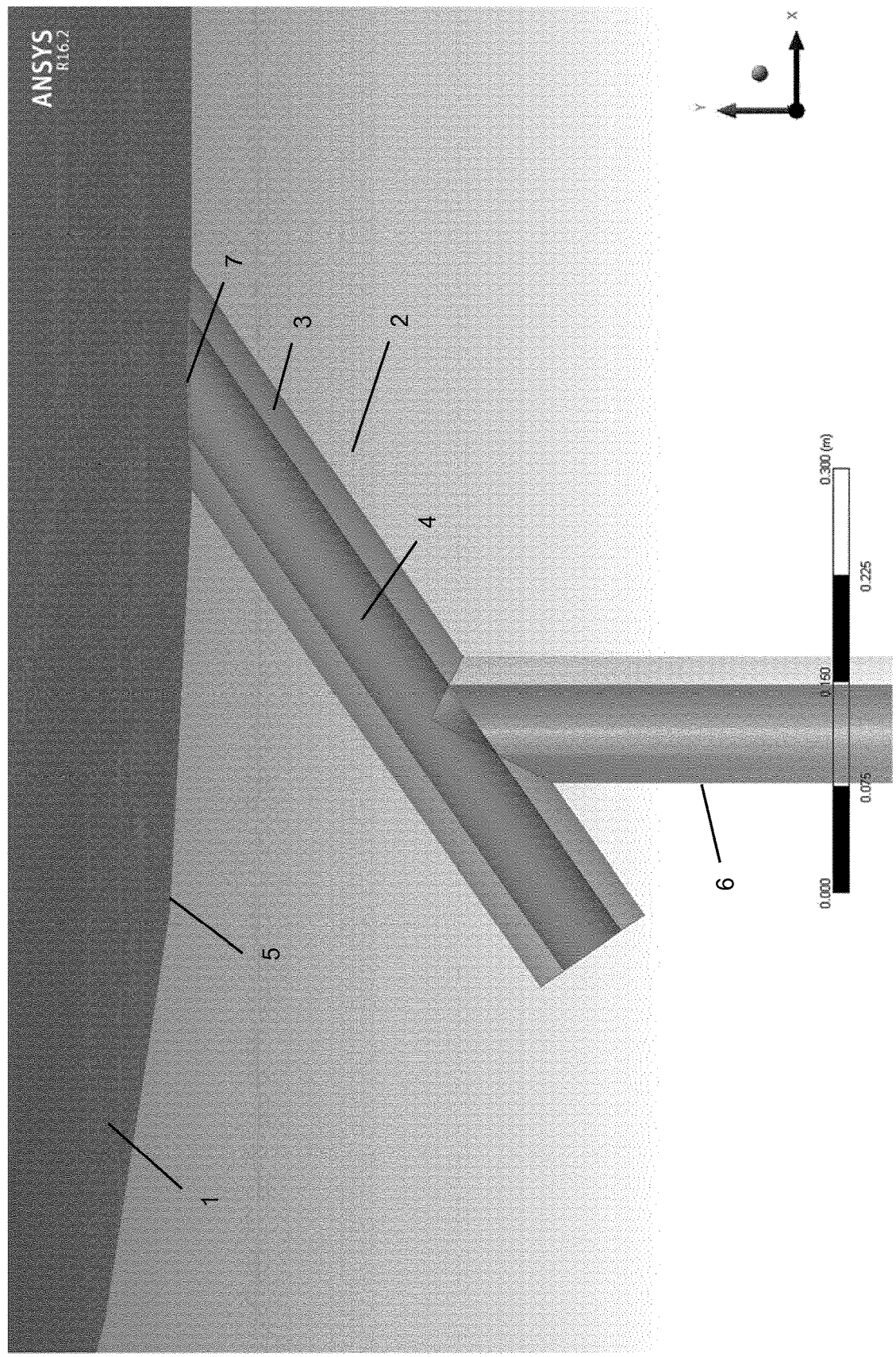

FIG. 4: Detail of a side view of a loop reactor comprising a withdrawal valve according to the invention in the closed position.

Figure 5:
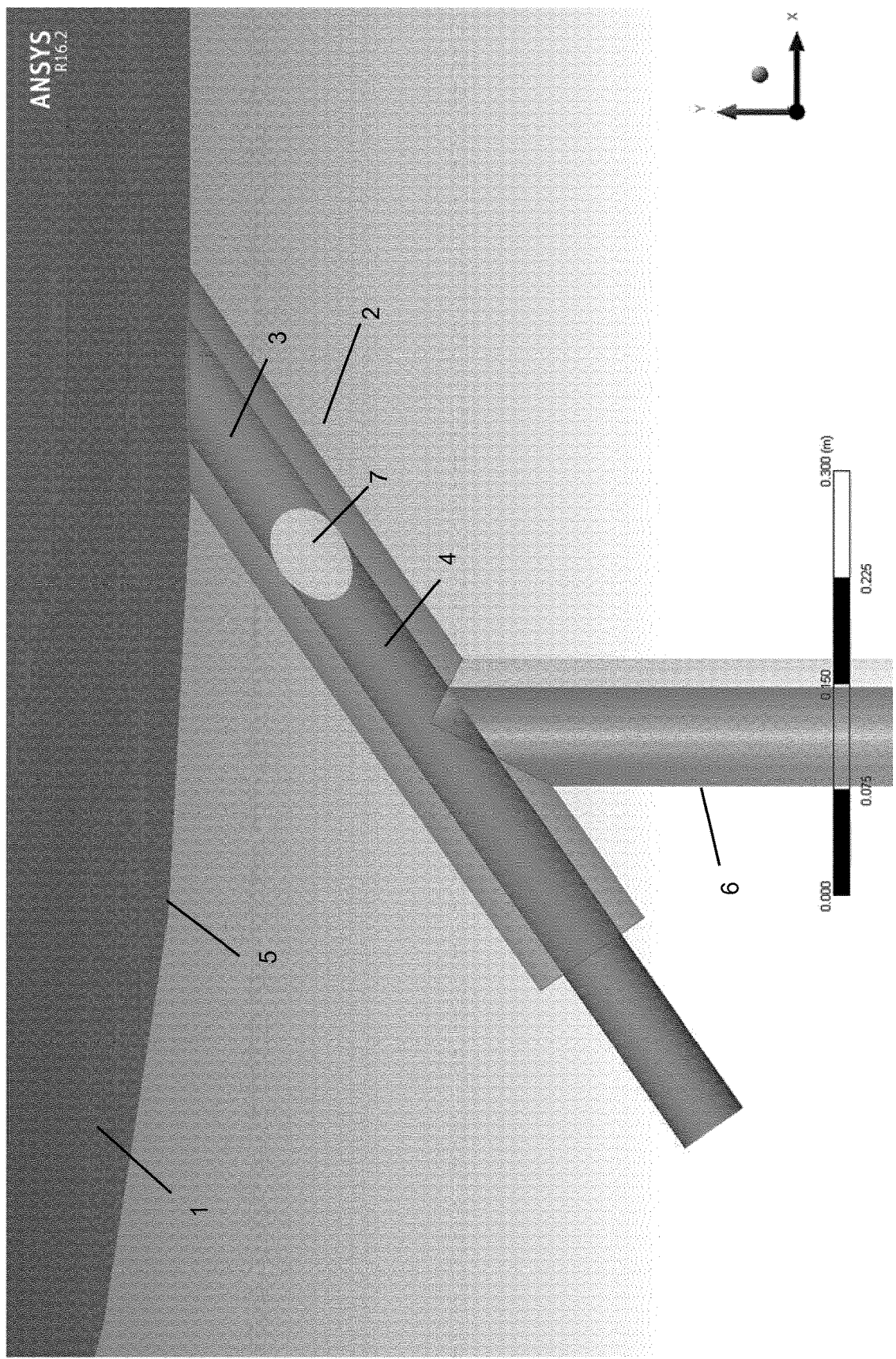

FIG. 5: Detail of a side view of a loop reactor comprising a withdrawal valve according to the invention in the half open position.

Figure 6:
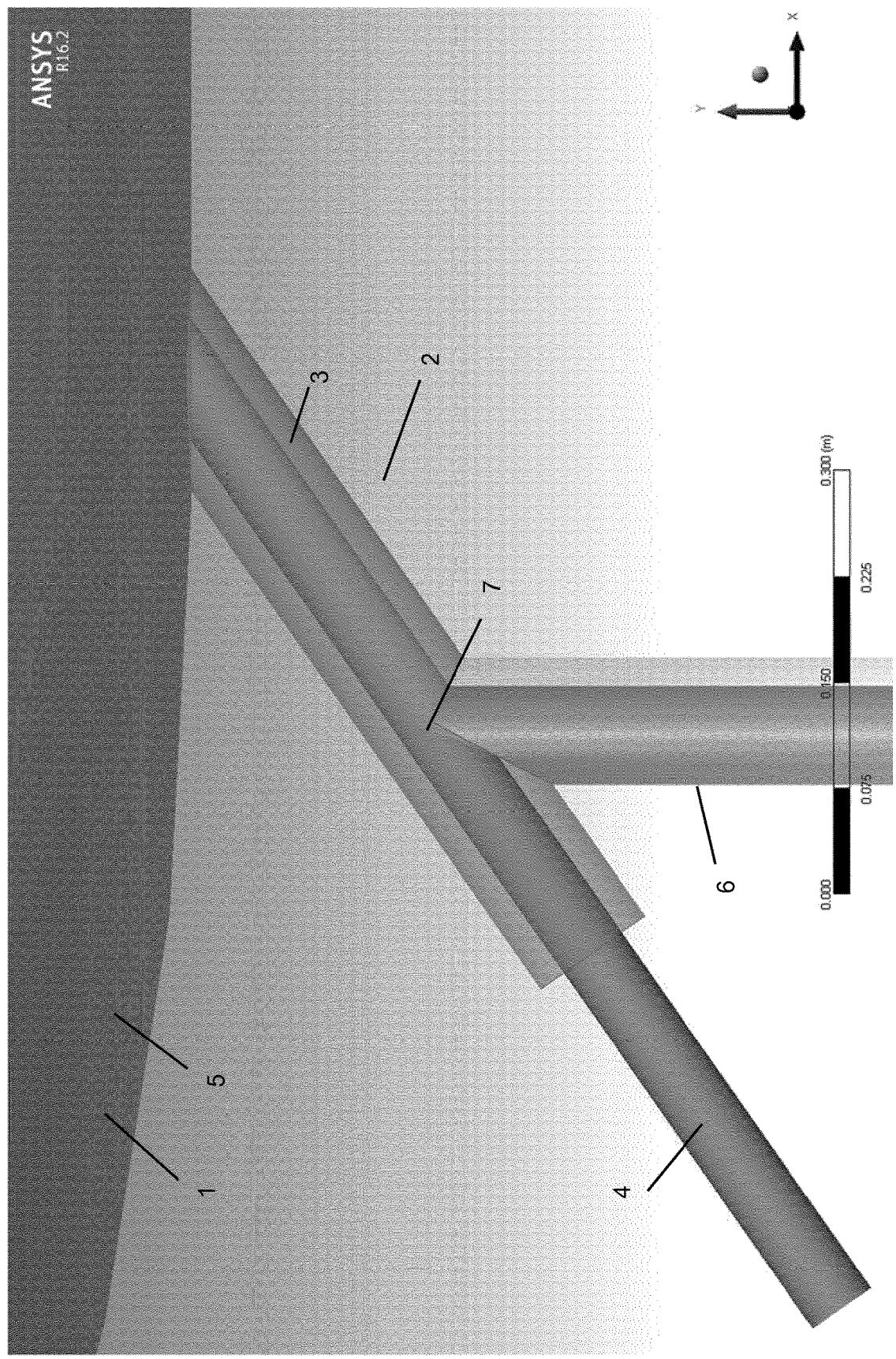

FIG. 6: Detail of a side view of a loop reactor comprising a withdrawal valve according to the invention in the fully open position.

DEFINITIONS

A 'polymerization reactor system' according to the present invention is a system in which an olefin polymer may be produced by polymerization. The system comprises at least one loop reactor and/or at least one transfer line, and further at least one withdrawal valve. Accordingly, the system may comprise two or more loop reactors in parallel and/or in series, and/or two or more transfer lines. Further, it may comprise additional reaction vessels, e.g. one ore more gas phase reactors, and means for further downstream processing, such as means for separating and recovering solid olefin polymer particles.]

A 'loop reactor' is a closed pipe typically completely filled with slurry in which the slurry is circulated with a high velocity along the pipe by using a circulation pump. Loop reactors are well known in the art and examples are given, for instance, in U.S. Pat. Nos. 4,582,816, 3,405,109, 3,324, 093, EP-A-479186 and U.S. Pat. No. 5,391,654. A loop reactor usually comprises vertical segments and horizontal segments, both interconnected by bends or elbows, respectively. Depending on whether a horizontal segment is interconnected via a bend or elbow to an upper end or to a lower end of a vertical segment, the horizontal segment either represents a lower or an upper horizontal segment.

A 'horizontal segment' of a loop reactor may either be straight or may exhibit a small amount of curvature. The amount of curvature may be up to 30°. The indicated amount of curvature refers to the exterior angle between the tangents at the endpoints of a circular arc corresponding to the curved horizontal segment.

A 'bend or elbow' interconnects vertical and horizontal segments of a loop reactor and exhibits an amount of curvature of more than 30°. The indicated amount of curvature refers to the exterior angle between the tangents at the endpoints of a circular arc corresponding to the bend or elbow. For instance, in case a horizontal segment is arranged perpendicular to a vertical segment of a loop reactor, the interconnecting bend or elbow has an amount of curvature of 90°.

A 'transfer line' is preferably a pipe and interconnects the at least one loop reactor of the polymerization reaction system to another loop reactor or to another reaction device, e.g. a gas phase reactor, such that polymer slurry including suspended olefin polymer particles can be transferred from the at least one loop reactor of the polymerization reaction system to a subsequent loop reactor or to a subsequent reaction device, for further polymerization in a cascaded polymerisation process. In order to monitor the polymerization in the at least one loop reactor of the polymerization reaction system and to determine the characteristics of the obtained polymer particles in the polymer slurry, samples of the polymer slurry may be withdrawn from a transfer line (sampling) prior to subjecting the polymer slurry to the next process step.

A 'slurry' or 'polymer slurry' is a heterogeneous mixture of solid particles dispersed in a liquid phase. The solid particles are usually solid olefin polymer particles obtained by a polymerization process. The fluid phase usually comprises unreacted olefin monomer and optional unreacted comonomer(s) and a diluent.

A 'withdrawal valve' according to the present invention comprises a valve cylinder and a valve piston within the valve cylinder, i.e. it is a piston valve. Piston valves are well known in the art. Generally, the valve piston can be moved back and forth within the valve cylinder along the longitudinal axis of the valve cylinder and is slidably sealed against the valve cylinder by sealing means such as O-rings. In a 'closed position' the valve piston occupies the full inner volume of the cylinder or at least part of it such that flow of polymer slurry through the valve cylinder is prevented. Upon opening, the valve piston is at least partially withdrawn from the valve cylinder such that flow of polymer slurry from the loop reactor and/or from the transfer line through the valve cylinder into a withdrawal conduit connected to the withdrawal valve is enabled. As a result, the loop reactor and/or the transfer line, the withdrawal valve and the withdrawal conduit are brought into open fluid communication. In a 'fully open position' the valve piston is withdrawn from the valve cylinder to such an extent that the valve piston does not limit the flow through the valve cylinder into a withdrawal conduit anymore.

The term 'effective withdrawal area' means the area for the flow of the polymer slurry that is effectively provided by a withdrawal means during the process of polymer slurry withdrawal. In case of a withdrawal valve, particularly a piston valve, the maximum withdrawal area that can be provided by the piston valve is the area of an inner cross-section of the valve cylinder perpendicular to the longitudinal axis of the valve cylinder. When the flow of the polymer slurry occupies the maximum withdrawal area upon withdrawal, the effective withdrawal area of the piston valve corresponds to the maximum withdrawal area. However, when zones are formed within the valve cylinder where no flow occurs upon withdrawal, the flow of the polymer slurry cannot occupy the maximum withdrawal area but the area of the zones where no flow occurs reduces the maximum withdrawal area. This limited withdrawal area then represents the effective withdrawal area.

The term 'withdrawal efficiency' refers to an amount of polymer slurry that is withdrawn from the loop reactor within a distinct time interval.

DETAILED DESCRIPTION

Polymerization Reactor System

In one aspect, the present invention refers to a polymerization reactor system comprising at least one loop reactor and/or at least one transfer line, and further comprising at least one withdrawal valve. At least one withdrawal valve is mounted to a wall of a lower horizontal segment of the at least one loop reactor. Accordingly, the at least one loop reactor may comprise one or two or more withdrawal valves. Further, one lower horizontal segment of the at least one loop reactor may comprise one or two or more withdrawal valves or two or more lower horizontal segments of the at least one loop reactor may each comprise one or two or more withdrawal valves. Furthermore, the at least one loop reactor may comprise other withdrawal means known in the prior art.

Additionally or in alternative, at least one withdrawal valve is mounted to a wall of the at least one transfer line. Accordingly, the at least one transfer line may comprise one or two or more withdrawal valves.

As defined above, the lower horizontal segment(s) of the loop reactor may either be straight or may exhibit a small amount of curvature of up to 30°.

The at least one withdrawal valve of the present invention is a piston valve. It comprises a valve cylinder and a valve piston within the valve cylinder. The valve cylinder defines an inner volume in which the valve piston can be slidably moved back and forth. Preferably, the inner cross-section of the valve cylinder perpendicular to the longitudinal axis of the valve cylinder is circular. In this case, the cross-section of the valve piston perpendicular to its longitudinal axis is also circular.

In the present invention, at least one withdrawal valve is mounted to a wall of a lower horizontal segment of the at least one loop reactor at an angle $\alpha$ of more than 0° and equal to or less than 85, determined from perpendicular to a tangent of the wall at the mounting position in flow direction of a slurry in the loop reactor. Preferably, the angle $\alpha$ is equal to or more than 15° to equal to or less than 70°, more preferably, the angle $\alpha$ is equal to or more than 30° to equal to or less than 55°, and even more preferably, the angle $\alpha$ is equal to or more than 40° to equal to or less than 50°.

Additionally or in alternative, at least one withdrawal valve is mounted to a wall of the at least one transfer line at an angle $\alpha$ of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one transfer line In most current loop reactors, the withdrawal valves are mounted to the wall of the reactor perpendicular to a tangent of the wall in the mounting position. As a result, the flow direction of the polymer slurry in the withdrawal valve is essentially perpendicular to the flow direction of the polymer slurry in the loop reactor upstream and downstream in the immediate vicinity of the mounting position. Upon withdrawal, the flow direction of the polymer slurry, hence, has to change considerably, i.e. about 90°. However, due to inertia effects on the polymer slurry, particularly on the solid olefin polymer particles in the polymer slurry, zones may form within the withdrawal valve, where no or almost no polymer slurry is present. Consequently, the effective withdrawal area of the withdrawal valve is limited such that the withdrawal efficiency and the overall throughput of the loop reactor decrease. Additionally, a smaller effective withdrawal area may promote plugging of the withdrawal valve, particularly in case of bigger solid polymer particles in the range of 1 mm and above or chunks thereof. Already partial plugging may cause flow restriction in the withdrawal valve leading to a further build-up of solid polymer particles. The same considerations apply mutatis mutandis to transfer lines, where the withdrawal valves are mounted to the wall thereof perpendicular to a tangent of the wall in the mounting position.

In contrast, in the present invention, at least one withdrawal valve is mounted to the wall of a lower horizontal segment of at least one loop reactor and/or at least one withdrawal valve is mounted to the wall of at least one transfer line at the angle $\alpha$ such that the withdrawal valve is oriented towards the flow direction of the polymer slurry in the at least one loop reactor and/or in the at least one transfer line. Hence, the change in the flow direction of the polymer slurry upon withdrawal is less pronounced such that no zones or at least less zones, where no or almost no polymer slurry is present, are formed within the withdrawal valve. Consequently, the effective withdrawal area of the withdrawal valve is not limited or at least less limited compared to a conventionally mounted withdrawal valve such that the withdrawal efficiency and the overall throughput of the loop reactor and/or of the transfer line are improved. Moreover, a lower flow resistance is obtained such that the risk of plugging of the withdrawal valve of the present invention is reduced. Additionally, the inventive withdrawal valve does not or essentially does not affect the flow of the polymer slurry in the reactor and/or in the transfer line by creating turbulences, respectively.

In a preferred embodiment, the at least one withdrawal valve may be mounted to the wall of a lower horizontal segment of the at least one loop reactor at a distance from the center of the lower horizontal segment of up to 40% of the total length of the lower horizontal segment. More preferably, the distance from the center of the lower horizontal segment is up to 30%, even more preferably up to 20%, and still more preferably up to 10%, of the total length of the lower horizontal segment. Thereby, the center of the lower horizontal segment defines the position on the lower horizontal segment of equal distance to the corresponding bend or elbow at the upstream end and to the corresponding bend or elbow at the downstream end of the lower horizontal segment. Further, the length of the lower horizontal segment refers to the dimension of the lower horizontal segment along the longitudinal axis. A mounting position at a limited distance from the center of the lower horizontal segment shall assure that the at least one withdrawal valve is not mounted adjacent to a bend or elbow of the loop reactor. Thereby it is avoided that turbulences in the flow of the polymer slurry in the reactor, caused by a change in the flow direction in the bend or elbow, can affect the withdrawal of polymer slurry through the withdrawal valve.

In a further preferred embodiment, the at least one withdrawal valve may be mounted to the wall of a lower horizontal segment of the loop reactor at the center of the lower horizontal segment. In this embodiment, the at least one withdrawal valve is mounted maximum remote to both the bend or elbow at the upstream end and to the bend or elbow at the downstream end of the lower horizontal segment.

Preferably, the inventive polymerization reactor system further comprises a withdrawal conduit connected to the at least one withdrawal valve at an angle β of more than 90° and less than 180°, preferably of equal to or more than 110° to equal to or less than 160°, determined from the longitudinal axis of the withdrawal valve in flow direction of a withdrawn slurry. The withdrawal conduit is connected to the valve cylinder of the at least one withdrawal valve in fluid communication and is sealed by the valve piston in a closed position of the withdrawal valve. Upon opening of the withdrawal valve, the valve piston is at least partially withdrawn from the valve cylinder such that a flow of polymer slurry from the at least one loop reactor and/or from the at least one transfer line through the valve cylinder into the withdrawal conduit is enabled. The withdrawn polymer slurry may be transferred via the withdrawal conduit to further processing steps, such as separating and recovering the solid olefin polymer particles. In case of a cascaded polymerization process, the withdrawn polymer slurry may first be transferred via the withdrawal conduit into a transfer line and then it may be transferred further to the next reaction vessel such as another loop reactor or a gas phase reactor. The withdrawal conduit is connected to the at least one withdrawal valve at the specific angle β. Thereby, the change in flow direction of the withdrawn polymer slurry when flowing from the valve cylinder into the withdrawal conduit is minimized such that the flow resistance is reduced and a smooth flow through the valve cylinder into the withdrawal conduit is enabled. Additionally, turbulences in the flow of the withdrawn polymer slurry are avoided or at least reduced, which prevents the build-up of bigger polymer particles or chunks that could lead to plugging of the withdrawal valve and/or the withdrawal conduit.

The valve piston of the at least one withdrawal valve comprises a valve plate.

The valve plate may be located at the end of the valve piston, which is directed towards the at least one loop reactor, and may define the surface of the valve piston that comes into contact with the inner volume of the at least one loop reactor and, thus, with the polymer slurry. Further, the valve plate is shaped according to an inner wall of the at least one loop reactor such that the valve piston is flush with the inner wall of the at least one loop reactor in a closed position of the withdrawal valve. This means that, in a closed position of the withdrawal valve, the end of the valve piston directed towards the at least one loop reactor does not protrude an inner wall of the loop reactor and does not extend into the inner volume of the at least one loop reactor. Rather, the surface of the valve piston that comes into contact with the inner volume of the at least one loop reactor (i.e. the valve plate) has been adapted to provide a smooth transition from an inner wall of said loop reactor to said surface and vice versa. In other words, the valve piston is flush with the adjacent inner wall of the at least one loop reactor. The advantage of a valve piston being flush with the inner wall of the at least one loop reactor in a closed position of the withdrawal valve is that the flow of the polymer slurry in the reactor is not affected, i.e. no turbulences are caused in the flow due to the absence of protrusions.

Additionally or in alternative, the valve plate may be located at the end of the valve piston, which is directed towards the at least one transfer line, and may define the surface of the valve piston that comes into contact with the inner volume of the at least one transfer line and, thus, with the polymer slurry. Further, the valve plate is shaped according to an inner wall of the at least one transfer line such that the valve piston is flush with the inner wall of the at least one transfer line in a closed position of the withdrawal valve. This means that, in a closed position of the withdrawal valve, the end of the valve piston directed towards the at least one transfer line does not protrude an inner wall of the at least one transfer line and does not extend into the inner volume of the at least one transfer line. Rather, the surface of the valve piston that comes into contact with the inner volume of the at least one transfer line (i.e. the valve plate) has been adapted to provide a smooth transition from an inner wall of said transfer line to said surface and vice versa. In other words, the valve piston is flush with the adjacent inner wall of the at least one transfer line. The advantage of a valve piston being flush with the inner wall of the at least one transfer line in a closed position of the withdrawal valve is that the flow of the polymer slurry in the transfer line is not affected, i.e. no turbulences are caused in the flow due to the absence of protrusions.

Moreover, the valve plate is preferably bevelled at an angle γ, determined from perpendicular to the longitudinal axis of the valve piston. The angle γ is preferably equal to the angle α. In case a withdrawal valve is mounted to the wall of the reactor perpendicular to the wall in the mounting position as in most conventional loop reactors, the valve plate is usually also perpendicular to the longitudinal axis of the valve piston. Therefore, the valve piston is flush with the inner wall of the loop reactor in a closed position of the withdrawal valve. However, in the present invention, at least one withdrawal valve including the valve piston is mounted to the wall of the reactor at an angle α and/or at least one withdrawal valve including the valve piston is mounted to the wall of the transfer line at an angle α. Accordingly, if a conventional valve piston having a valve plate that is perpendicular to the longitudinal axis of the valve piston was applied, the valve piston would protrude the inner wall of the loop reactor and extend into the inner volume of the loop reactor in a closed position or it would at least not be flush with the adjacent inner wall of the loop reactor. As result, turbulences would be caused in the flow of the polymer slurry, which shall be avoided in general. Therefore, the valve plate according to the present invention is preferably bevelled at an angle γ, determined from perpendicular to the longitudinal axis of the valve piston, which is equal to the angle α such that the valve piston is also flush with the adjacent inner wall of the loop reactor and the formation of undesired turbulences in the flow of the polymer slurry is prevented. The same considerations apply mutatis mutandis, if a conventional valve piston having a valve plate that is perpendicular to the longitudinal axis of the valve piston was mounted to the at least one transfer line.

It is further preferred that the valve piston is mounted in the valve cylinder axially rotatable such that the valve piston axially rotates by 180°, when being moved from the closed position to a fully open position. It is even further preferred that the valve plate acts as a flow guide in the fully open position for the flow of the withdrawn slurry into the withdrawal conduit. As described above, in the closed position, the valve piston occupies the full inner volume of the cylinder or at least part of it, such that any flow of polymer slurry through the valve cylinder is prevented. Preferably, the valve piston is flush with the adjacent inner wall of the loop reactor and/or with the adjacent inner wall of the transfer line in the closed position due to a bevelled valve plate. Further, in the fully open position, the valve piston is withdrawn from the valve cylinder to such an extent that it does not limit the flow through the valve cylinder into the withdrawal conduit anymore. Thereby, an axial rotation of the valve piston by 180°, when reaching the fully open position, enables the bevelled valve plate to act as a flow guide for the flow of the withdrawn polymer slurry into the withdrawal conduit. Herein, a flow guide defines a means for directing the flow of polymer slurry without essentially increasing the flow resistance, without essentially affecting the flow velocity and without essentially causing turbulences. Hence, enabling the bevelled valve plate to act as a flow guide by an axial rotation of the valve piston by 180°, when being moved from the closed position to the fully open position, results in a smooth flow of the withdrawn polymer slurry into the withdrawal conduit in the fully open position, i.e. no or essentially no turbulences are caused in the flow, which reduces the risk of plugging further. In contrast, in a conventional loop reactor, where the withdrawal valve is mounted perpendicular to the wall of the loop reactor, the valve plate, which is not bevelled but usually perpendicular to the longitudinal axis of the valve piston, cannot act as a flow guide in the fully open position even if it is axially rotated by 180°, i.e. it cannot contribute to a smooth flow of the withdrawn polymer slurry. Rather, it adds to the change in the flow direction of the withdrawn polymer slurry, which may cause an increase in the flow resistance, affect the flow velocity, and cause turbulences in the flow of the withdrawn polymer slurry leading to an increased risk of plugging. Additionally, solid olefin polymer particles may accumulate on the valve plate promoting the built-up of polymer chunks. The above considerations equally apply to a conventional transfer line, where the withdrawal valve is mounted perpendicular to the wall of the transfer line. It is to be noted that the above increase in the flow resistance and the creation of turbulences in the flow of the withdrawn polymer slurry leading to an increased risk of plugging might also apply to the bevelled valve plate according to the present invention in case the valve piston was not mounted in the cylinder axially rotatable such that the valve piston axially rotates by 180°, when being moved from the closed position to a fully open position. Similarly, the valve piston axially rotates by 180°, when being moved back from the fully open position to the closed position. Thereby, it is assured that the valve piston including the bevelled valve plate is again flush with the adjacent inner wall of the at least one loop reactor in the closed position and/or with the adjacent inner wall of the at least one transfer line in the closed position.

The valve piston may be mounted in the valve cylinder axially rotatable clockwise and/or counterclockwise. Further, it may rotate evenly or unevenly when being moved from the closed position to the fully open position, provided that it axially rotates by 180° in the fully open position.

Method for Producing an Olefin Polymer

In a further aspect, the present invention relates to a method for producing an olefin polymer in a polymerization reactor system.

The olefin polymer produced in the loop reactor can be an olefin homo- or copolymer.

In a first step, at least one olefin monomer, optionally comonomer, diluent and catalyst are supplied to at least one loop reactor.

The at least one olefin monomer is preferably an alpha-olefin monomer having from 2 to 12 carbon atoms, preferably from 2 to 10 carbon atoms. Preferably, the at least one olefin monomer is ethylene or propylene, optionally together with one or more other alpha-olefins having from 2 to 8 carbon atoms. Especially preferably, the method of the present invention is used for polymerizing ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

The catalyst may be any catalyst, which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 2 to 100 μm. However, it has turned out that special advantages can be obtained if the support has median particle size from 6 to 90 μm, preferably from 6 to 70 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above-mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of *Borealis*.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore, they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

If needed, the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound, which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The metallocene catalyst is used together with an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

The diluent is preferably an inert diluent and typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. An especially preferred diluent is propane, possibly containing minor amount of methane, ethane and/or butane.

In a second step of the inventive method, the at least one olefin monomer and optionally comonomer is polymerized to produce a liquid slurry comprising a liquid medium and solid olefin polymer particles.

The present polymerisation step is usually conducted as a particle form process. In such a process, the polymerisation catalyst is supplied to the loop reactor in particle form, preferably through a prepolymerisation step as described below. The olefin polymer then grows on the catalyst particles thereby forming a slurry comprising solid olefin polymer particles.

The polymerisation in the at least one loop reactor is conducted as a slurry polymerisation. The slurry polymerisation usually takes place in the supplied diluent as defined above.

The olefin monomer content in the liquid phase of the slurry may be from 1 to 50 mol %, preferably from 2 to 20 mol % and in particular from 2 to 10 mol %. The benefit of having a high olefin monomer concentration is that the productivity of the catalyst is increased but the drawback is that more olefin monomer then needs to be recycled than if the concentration was lower.

The temperature in the at least one loop reactor is typically from 60 to 100° C., preferably from 70 to 90° C. An excessively high temperature should be avoided to prevent partial dissolution of the polyolefin into the diluent and the fouling of the reactor. The pressure is from 1 to 150 bar, preferably from 40 to 80 bar.

Hydrogen is preferably introduced into the loop reactor for controlling the melt flow rate (MFR) of the olefin polymer. The amount of hydrogen needed to reach a desired MFR depends on the catalyst used and the polymerisation conditions.

The average residence time in the at least one loop reactor is typically from 20 to 120 minutes, preferably from 30 to 80 minutes. As it is well known in the art the average residence time T can be calculated from:

$$\tau = \frac{V_R}{Q_o} \qquad \text{(eq. 1)}$$

where $V_R$ is the volume of the reaction space (i.e. the volume of the reactor) and $Q_o$ is the volumetric flow rate of the product stream (including the polyolefin product and the fluid reaction mixture).

The production rate in the at least one loop reactor is suitably controlled with the catalyst feed rate. It is also possible to influence the production rate by suitable selection of the olefin monomer concentration in the at least one loop reactor. The desired olefin monomer concentration can then be achieved by suitably adjusting the olefin monomer feed rate into the at least one loop reactor.

In a third step, at least a portion of the liquid slurry, including the solid olefin polymer particles, is withdrawn via at least one withdrawal valve.

The at least one withdrawal valve is mounted to a wall of a lower horizontal segment of the at least one loop reactor at an angle α of more than 0° and equal to or less than 85°, preferably of equal to or more than 15° to equal to or 3.0 less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one loop reactor.

Additionally or alternatively, in case the liquid slurry is transferred from the at least one loop reactor via at least one transfer line, the at least one withdrawal valve is mounted to a wall of the at least one transfer line at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one transfer line.

As outlined in detail above for the inventive polymerization reactor system, orienting at least one withdrawal valve towards the flow direction of the liquid slurry in the at least one loop reactor and/or towards the flow direction of the liquid slurry in the at least one transfer line has the effect that the change in the flow direction of the polymer slurry upon withdrawal is less pronounced such that no zones or at least less zones, where no or almost no polymer slurry is present, are formed within the at least one withdrawal valve. Hence, the effective withdrawal area of the withdrawal valve is not limited or at least less limited compared to a conventionally withdrawal valve mounted perpendicular to the respective wall such that the withdrawal efficiency and the overall throughput of the at least one loop reactor and/or of the at least one transfer line are improved. Moreover, a lower flow resistance is obtained such that the risk of plugging of the withdrawal valve of the present invention is reduced.

In a fourth step of the method according to the present invention, the withdrawn liquid slurry is transferred via a withdrawal conduit.

The withdrawal conduit is connected to the at least one withdrawal valve at an angle β of more than 90° and less than 180°, determined from the longitudinal axis of the withdrawal valve in flow direction of a withdrawn slurry. Preferably, the angle β is equal to or more than 110° and equal to or less than 160°.

As outlined in detail above for the inventive polymerization reactor system, connecting the withdrawal conduit to the at least one withdrawal valve at the specific angle β assures that the change in flow direction of the withdrawn polymer slurry when flowing from the valve cylinder into the withdrawal conduit, is minimized such that the flow resistance is reduced and a smooth flow through the valve cylinder into the withdrawal conduit is enabled. Additionally, turbulences in the flow of the withdrawn polymer slurry are avoided or at least reduced, which prevents the build-up of bigger polymer particles or chunks that could lead to plugging of the withdrawal valve and/or the withdrawal conduit.

The withdrawn polymer slurry may be transferred via the withdrawal conduit to further processing steps, such as separation of the solid olefin particles and recovery of unreacted olefin monomer, or it may be transferred via the withdrawal conduit into a transfer line and then it may be transferred further to the next reaction vessel in case of a cascaded polymerization process. Subsequent polymerization vessels, if present, may be further slurry polymerization reactors or they may also be gas phase polymerization reactors. Examples of such gas phase polymerization reactors are a fluidized bed polymerization reactor, a fast fluidized bed reactor, a settled bed reactor and combinations of these. Subsequent polymerization reactors may be any reactors known to the person skilled in the art.

It is to be noted that each definition, limitation and technical benefit as described above for the polymerization reactor system according of the present invention, equally applies to the present method for producing an olefin polymer, particularly to the third and fourth step.

Accordingly, it is inter alia preferred that the at least one withdrawal valve is mounted to the wall of a lower horizontal segment of the at least one loop reactor at a distance from the center of the lower horizontal segment of up to 40% of the total length of the lower horizontal segment. More preferably, the distance from the center of the lower horizontal segment is up to 30%, even more preferably up to 20%, and still more preferably up to 10%, of the total length of the lower horizontal segment. This shall assure that the at least one withdrawal valve is not mounted adjacent to a bend or elbow of the at least one loop reactor in order to avoid turbulences in the flow of the polymer slurry in the reactor, caused by a change in the flow direction in the bend or elbow.

Further preferred is that the at least one withdrawal valve is mounted to the wall of a lower horizontal segment of the at least one loop reactor at the center of the lower horizontal segment such that the at least one withdrawal valve is maximum remote to both the bend or elbow at the upstream end and to the bend or elbow at the downstream end of the lower horizontal segment.

In one embodiment of the method, the valve piston comprises a valve plate at an end directed to the at least one loop reactor, wherein the valve plate is shaped according to an inner wall of the at least one loop reactor such that the valve piston is flush with the inner wall of the at least one loop reactor in a closed position of the valve. In such an embodiment, the end of the valve piston directed towards the loop reactor does not protrude an inner wall of the at least one loop reactor and does not extend into the inner volume of the at least one loop reactor in a closed position of the withdrawal valve. As a result, the flow of the polymer slurry in the reactor is not affected.

Additionally or in alternative, the valve piston comprises a valve plate located at the end of the valve piston, which is directed towards the at least one transfer line, wherein the valve plate is shaped according to an inner wall of the at least one transfer line such that the valve piston is flush with the inner wall of the at least one transfer line in a closed position of the withdrawal valve. In such an embodiment, the end of the valve piston directed towards the at least one transfer line does not protrude an inner wall of the at least one transfer line and does not extend into the inner volume of the at least one transfer line in a closed position of the withdrawal valve. As a result, the flow of the polymer slurry in the transfer line is not affected, i.e. no turbulences are caused in the flow due to the absence of protrusions.

It is further preferred that the valve plate is bevelled at an angle γ, determined from perpendicular to the longitudinal axis of the valve piston. The angle γ is preferably equal to the angle α such that the valve piston is flush with the adjacent inner wall of the at least one loop reactor and/or such that the valve piston is flush with the adjacent inner wall of the at least one transfer line. Thereby, the formation of undesired turbulences in the flow of the polymer slurry is prevented.

Moreover, the withdrawal step, which is the third step of the present method, preferably includes opening the at least one withdrawal valve by moving the valve piston from a closed position to a fully open position, wherein the piston is simultaneously axially rotated by 180°, and closing the at least one withdrawal valve by moving the valve piston from the fully open position to the closed position, wherein the piston is simultaneously axially rotated by 180°. This procedure shall ensure that the preferably bevelled valve plate is enabled to act as a flow guide for the flow of the withdrawn polymer slurry into the withdrawal conduit in the fully open position. As a result, a smooth flow of the withdrawn polymer slurry into the withdrawal conduit is obtained, i.e. no or essentially no turbulences are caused in the flow, which reduces the risk of plugging further. Additionally, the valve piston including the preferably bevelled valve plate is again flush with the adjacent inner wall of the at least one loop reactor and/or with the adjacent inner wall of the at least one transfer line after closing the withdrawal valve.

Optionally, a prepolymerisation step precedes the first step of the method according to the present invention. The purpose of the prepolymerisation is to polymerize a small amount of olefin polymer onto the catalyst at a low temperature and/or a low olefin monomer concentration. By prepolymerization, it is possible to improve the performance of the catalyst in slurry and/or modify the properties of the final olefin polymer. The prepolymerization step is preferably conducted in a slurry reactor.

Thus, the prepolymerization step may be conducted in a loop reactor. The prepolymerization is then preferably conducted in a diluent, preferably an inert diluent. The diluent is typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 70° C. and more preferably from 30 to 60° C.

The pressure is not critical and is typically from 1 to 150 bar, preferably from 10 to 100 bar.

The amount of olefin monomer is typically such that from about 0.1 to 1000 grams of olefin monomer per one gram of solid catalyst component is polymerised in the prepolymerization step. As the person skilled in the art knows, the catalyst particles recovered from a continuous prepolymerization reactor do not all contain the same amount of prepolymer. Instead, each particle has its own characteristic amount, which depends on the residence time of that particle in the prepolymerization reactor. As some particles remain in the reactor for a relatively long time and some for a relatively short time, also the amount of prepolymer on different particles is different and some individual particles may contain an amount of prepolymer, which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately, it is possible that only a part of the cocatalyst is introduced into the prepolymerization stage and the remaining part is supplied to subsequent polymerization stages. Also in such cases it is necessary to introduce so much cocatalyst into the prepolymerization stage that a sufficient polymerization reaction is obtained therein.

Use

In another aspect, the present invention refers to the use of at least one withdrawal valve comprising a valve cylinder and a valve piston within the valve cylinder, wherein the at least one withdrawal valve is mounted to a wall of a lower horizontal segment of a loop reactor at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the loop reactor, for increasing the withdrawal efficiency from the at least one loop reactor, and/or wherein the at least one withdrawal valve is mounted to a wall of at least one transfer line at an angle α of more than 0° and equal to or less than 85°, preferably of equal to or more than 15° to equal to or less than 70°, more preferably of equal to or more than 30° to equal to or less than 55°, most preferably of equal to or more than 40° to equal to or less than 50°, determined from perpendicular to a tangent of the wall at the mounting position in flow direction of a slurry in the at least one transfer line, for increasing the withdrawal efficiency from the at least one transfer line. The valve piston of the at least one withdrawal valve comprises a valve plate at an end directed to the at least one loop reactor, the valve plate being shaped according to an inner wall of the at least one loop reactor such that the valve piston is flush with the inner wall of the at least one loop reactor in a closed position of the withdrawal valve. Additionally or in alternative, the valve piston of the at least one withdrawal valve comprises a valve plate at an end directed to the at least one transfer line, the valve plate being shaped according to an inner wall of the at least one transfer line such that the valve piston is flush with the inner wall of the at least one transfer line in a closed position of the withdrawal valve.

In this regard, it is to be noted that each definition, limitation and technical benefit as described above for the polymerization reactor system according of the present invention, equally applies to the use of the at least one withdrawal valve.

Benefits of the Invention

By mounting at least one withdrawal valve to the wall of a lower horizontal segment of at least one loop reactor in the polymerization reactor system at a specific angle α, the withdrawal valve is oriented towards the flow direction of the polymer slurry in the at least one loop reactor. Similarly, by mounting at least one withdrawal valve to the wall of at least one transfer line in the polymerization reactor system at a specific angle α, the withdrawal valve is oriented towards the flow direction of the polymer slurry in the transfer line. As a result, the change in the flow direction of the polymer slurry upon withdrawal is less pronounced such that no zones or at least less zones, where no or almost no polymer slurry is present, are formed within the withdrawal valve, respectively. Consequently, the effective withdrawal area of the withdrawal valve is not limited or at least less limited compared to a conventionally mounted withdrawal valve such that the withdrawal efficiency and the overall throughput of the at least one loop reactor and/or of the at least one transfer line are improved.

Moreover, a lower flow resistance is obtained such that the risk of plugging of the withdrawal valve of the present invention is reduced. Additionally, the inventive withdrawal valve does not or essentially does not affect the flow of the polymer slurry in the reactor by creating turbulences.

Figures

In the following, the present invention will be described further with reference to the figures.

FIG. 1 shows a detail of a side view of a loop reactor (1) comprising a withdrawal valve (2) according to the prior art. The withdrawal valve (2) comprises a valve cylinder (3) and a valve piston (4) within the valve cylinder (3). The withdrawal valve (2) is mounted to the wall (5) of a lower horizontal segment of the reactor (1) perpendicular to a tangent of the wall (5) in the mounting position. FIG. 1 illustrates the withdrawal valve (2) in the fully open position, i.e. the valve piston (4) is withdrawn from the valve cylinder (3) to such an extent that the valve piston (4) does not limit the flow through the valve cylinder (3) into a withdrawal conduit (6) anymore. The valve piston (4) comprises a valve plate (7) located at the end of the valve piston (4), which is directed towards the loop reactor (1). The valve plate (7) is perpendicular to the longitudinal axis of the valve piston (4) such that the valve piston (4) is flush with the inner wall of the loop reactor (1) in a closed position of the withdrawal valve (2).

As can be derived from FIG. 2 illustrating the solid olefin polymer particle distribution during withdrawal in the prior art loop reactor (1) of FIG. 1, the flow direction of the polymer slurry in the withdrawal valve (2) is essentially perpendicular to the flow direction of the polymer slurry in the loop reactor (1) upstream in the immediate vicinity of the mounting position (the flow direction of the polymer slurry in the loop reactor is indicated by the upper arrow). Therefore, the flow direction of the polymer slurry has to change considerably, i.e. about 90°, upon withdrawal. Due to inertia effects on the polymer slurry, particularly on the solid olefin polymer particles in the polymer slurry, zones are formed within the withdrawal valve (2), where no or almost no polymer slurry is present (further indicated by the lower arrow). As a result, the effective withdrawal area of the withdrawal valve (2) is clearly limited such that the withdrawal efficiency and the overall throughput of the loop reactor decrease. Additionally, the smaller effective withdrawal area may promote plugging of the withdrawal valve (2), particularly in case of bigger solid polymer particles in the range of 1 mm and above or chunks thereof. Furthermore, FIG. 2 clearly illustrates that the valve plate (7) does not act as a flow guide in the fully open position even if it is axially rotated by 180° In other words, the valve plate (7), does not contribute to a smooth flow of the withdrawn polymer slurry. In contrast, it adds to a considerable change in the flow direction of the withdrawn polymer slurry in the withdrawal valve (2) that causes an increase in the flow resistance, affects the flow velocity, and causes turbulences in the flow of the withdrawn polymer slurry leading to an increased risk of plugging. Additionally, it is apparent that solid olefin polymer particles strongly accumulate on the valve plate (7) promoting the built-up of polymer chunks further.

An embodiment of a polymerization reactor system comprising a loop reactor (1) and a withdrawal valve (2) according to the present invention is shown in FIG. 3 and overcomes the above disadvantages. In particular, one withdrawal valve (2) comprising a valve cylinder (3) and a valve piston (4) is mounted to the wall (5) of a lower horizontal segment of the loop reactor (1) at an angle α of 50°, determined from perpendicular to a tangent of the wall (5) at the mounting position in flow direction of a slurry in the loop reactor (1) (the flow direction is indicated by the arrow). Due to the orientation of the withdrawal valve (2) towards the flow direction of the polymer slurry downstream in the loop reactor (1), the change in the flow direction upon withdrawal is less pronounced such that no zones or at least less zones, where no or almost no polymer slurry is present, are formed within the withdrawal valve (2). As a result, the effective withdrawal area of the withdrawal valve (2) is not limited or at least less limited compared to a conventionally mounted withdrawal valve such that the withdrawal efficiency and the overall throughput of the loop reactor (1) are improved. Additionally, a lower flow resistance is obtained such that the risk of plugging of the withdrawal valve (2) is reduced. In this embodiment, the lower horizontal segment is straight and the withdrawal valve (2) is mounted to the wall (5) of the lower horizontal segment at the center thereof. Accordingly, the withdrawal valve (2) is mounted maximum remote to both the bend or elbow (8) at the upstream end and to the bend or elbow (8) at the downstream end of the lower horizontal segment such that turbulences in the flow of the polymer slurry in the reactor (1), caused by a change in the flow direction in the bend or elbow (8), which can affect the withdrawal of polymer slurry, are avoided. Moreover, the withdrawal conduit (6) is connected to the withdrawal valve (2) at an angle β of 140°, determined from the longitudinal axis of the withdrawal valve (2) in flow direction of a withdrawn slurry, in order to minimize the change in flow direction of the withdrawn polymer slurry when flowing from the valve cylinder (3) into the withdrawal conduit (6) such that flow resistance is obtained and a smooth flow through the valve cylinder (3) into the withdrawal conduit (6) is enabled. Thereby, the risk of plugging is reduced further. The withdrawal valve (2) is shown in FIG. 3 in the closed position. Moreover, in the illustrated embodiment, the valve plate (7) is shaped according to the inner wall of the loop reactor (1), in particular the valve plate (7) is bevelled at an angle γ of 50°, determined from perpendicular to the longitudinal axis of the valve piston (4). As a result, the valve piston (4) is flush with the adjacent inner wall of the loop reactor (1) in the closed position of the withdrawal valve (2) despite an orientation of the withdrawal valve (2) towards the flow direction of the polymer slurry. Consequently, the flow of the polymer slurry in the reactor (1) is not affected by the withdrawal valve (2) in the closed position and undesired turbulences in the flow are prevented.

In FIG. 4, the withdrawal valve (2) is also shown in the closed position, where the valve piston (4) is also flush with the adjacent inner wall of the loop reactor (1) due to the bevelled valve plate (7).

Upon opening the withdrawal valve (2), the valve piston (4) is withdrawn from the valve cylinder (3), i.e. the valve piston (4) is moved within the valve cylinder (3) from the closed position towards the fully open position. As the valve piston (4) is mounted in the valve cylinder (3) axially rotatable, the valve piston (4) is simultaneously rotated such that it has axially rotated by 180° when finally reaching the fully open position (cf. FIG. 6). In the embodiment shown in FIGS. 4 to 6, the valve piston (4) rotates evenly, i.e. when being moved half the distance from the closed position towards the fully open position, the valve piston (4) is simultaneously rotated by 90° as illustrated by FIG. 5.

In the fully open position as shown in FIG. 6, the valve piston (4) is axially rotated by 180° relative to the closed position. This enables the bevelled valve plate (7) to act as a flow guide for the flow of the withdrawn polymer slurry into the withdrawal conduit (6). As a result, a smooth flow of the withdrawn polymer slurry into the withdrawal conduit (6) is obtained, i.e. no or essentially no turbulences are caused in the flow, which reduces the risk of plugging further.

Upon closing, the valve piston (4) again axially rotates by 180°, when being moved back from the fully open position to the closed position. Thereby, it is assured that the valve piston (4) including the bevelled valve plate (7) is again flush with the adjacent inner wall of the loop reactor (1) in the closed position.

The invention claimed is:

1. A polymerization reactor system comprising at least one loop reactor, and further comprising at least one withdrawal valve, the at least one withdrawal valve comprising a valve cylinder and a valve piston within the valve cylinder,
   wherein the at least one withdrawal valve is mounted to a wall of a lower horizontal segment of the at least one loop reactor at an angle α of more than 0° and equal to or less than 85°, determined from perpendicular to a tangent of the wall at the mounting position in flow direction of a slurry in the at least one loop reactor; and
   wherein the valve piston of the at least one withdrawal valve comprises a valve plate at an end directed to the at least one loop reactor, the valve plate being shaped according to an inner wall of the at least one loop reactor such that the valve piston is flush with the inner wall of the at least one loop reactor in a closed position of the withdrawal valve; and
   wherein the valve piston is mounted in the valve cylinder axially rotatably such that the valve piston axially rotates by 180° when being move from the closed position to a fully open position.

2. The polymerization reactor system according to claim 1, wherein the at least one withdrawal valve is mounted to the wall of a lower horizontal segment of the at least one loop reactor at a distance from the center of the lower horizontal segment of up to 40%, of the total length of the lower horizontal segment.

3. The polymerization reactor system according to claim 1, wherein the at least one withdrawal valve is mounted to the wall of a lower horizontal segment of the at least one loop reactor at the center of the lower horizontal segment.

4. The polymerization reactor system according to claim 1, further comprising a withdrawal conduit connected to the at least one withdrawal valve at an angle β of more than 90° and less than 180°, determined from the longitudinal axis of the withdrawal valve in flow direction of a withdrawn slurry.

5. The polymerization reactor system according to claim 1, wherein the valve plate is bevelled at an angle γ, determined from perpendicular to the longitudinal axis of the valve piston.

6. The polymerization reactor system according to claim 4, wherein the valve plate acts as a flow guide in the fully open position for the flow of the withdrawn slurry into the withdrawal conduit.

7. A method for producing an olefin polymer in a polymerization reactor system comprising the steps of
   supplying at least one olefin monomer, optionally comonomer, diluent and catalyst to at least one loop reactor;
   polymerizing the at least one olefin monomer and optionally comonomer to produce a liquid slurry comprising a liquid medium and solid olefin polymer particles;
   withdrawing at least a portion of the liquid slurry via at least one withdrawal valve, the at least one withdrawal valve comprising a valve cylinder and a valve piston within the valve cylinder,
      wherein the at least one withdrawal valve is mounted to a wall of a lower horizontal segment of the at least one loop reactor at an angle α of more than 0° and equal to or less than 85°, determined from perpendicular to a tangent of the wall at the mounting position in flow direction of a slurry in the at least one loop reactor;
      wherein the valve piston of the at least one withdrawal valve comprises a valve plate at an end directed to the at least one loop reactor, the valve plate being shaped according to an inner wall of the at least one loop reactor such that the valve piston is flush with the inner wall of the at least one loop reactor in a closed position of the withdrawal valve; and
      wherein the valve piston is mounted in the valve cylinder axially rotatably such that the valve piston axially rotates by 180° when being moved from the closed position to a fully open position; and
   transferring the withdrawn liquid slurry via a withdrawal conduit connected to the at least one withdrawal valve at an angle β of more than 90° and less than 180°, determined from the longitudinal axis of the withdrawal valve in flow direction of the withdrawn slurry.

8. The method for producing an olefin polymer according to claim 7, wherein the at least one withdrawal valve is mounted to the wall of a lower horizontal segment of the at least one loop reactor at a distance from the center of the lower horizontal segment of up to 40%, of the total length of the lower horizontal segment.

9. The method for producing an olefin polymer according to claim 7, wherein the at least one withdrawal valve is mounted to the wall of a lower horizontal segment of the at least one loop reactor at the center of the lower horizontal segment.

10. The method for producing an olefin polymer according to claim 7, wherein the valve plate is bevelled at an angle γ, determined from perpendicular to the longitudinal axis of the valve piston.

11. The method for producing an olefin polymer according to claim 7, wherein the withdrawal step includes
    opening the at least one withdrawal valve by moving the valve piston from a closed position to a fully open position, wherein the piston is simultaneously axially rotated by 180°, and
    closing the at least one withdrawal valve by moving the valve piston from the fully open position to the closed position, wherein the piston is simultaneously axially rotated by 180°.

12. A polymerization reactor system comprising at least one transfer line and further comprising at least one withdrawal valve, the at least one withdrawal valve comprising a valve cylinder and a valve piston within the valve cylinder;
    wherein the at least one withdrawal valve is mounted to a wall of the at least one transfer line at an angle α of more than 0° and equal to or less than 85°, determined from perpendicular to a tangent of the wall at the mounting position in flow direction of a slurry in the at least one transfer line;
    wherein the valve piston of the at least one withdrawal valve comprises a valve plate at an end directed to the at least one transfer line, the valve plate being shaped according to an inner wall of the at least one transfer line such that the valve piston is flush with the inner wall of the at least one transfer line in a closed position of the withdrawal valve; and
    wherein the valve piston is mounted in the valve cylinder axially rotatable such that the valve piston axially rotates by 180°, when being moved from the closed position to a fully open position.

13. The polymerization reactor system of claim 12, wherein angle α is equal to or more than 15° to equal to or less than 70°.

14. The polymerization reactor system of claim 12, wherein the angle α is equal to or more than 30° to equal to or less than 55°.

15. The polymerization reactor system of claim 12, wherein the angle α is equal to or more than 40° to equal to or less than 50°.

16. A method for producing an olefin polymer in a polymerization reactor system comprising the steps of:
supplying at least one olefin monomer, optionally comonomer, diluent and catalyst to at least one loop reactor;
polymerizing the at least one olefin monomer and optionally comonomer to produce a liquid slurry comprising a liquid medium and solid olefin polymer particles;
withdrawing at least a portion of the liquid slurry via at least one withdrawal valve, the at least one withdrawal valve comprising a valve cylinder and a valve piston within the valve cylinder,
wherein the at least one withdrawal valve is mounted to a wall of at least one transfer line at an angle $\alpha$ of more than 0° and equal to or less than 85°, determined from perpendicular to a tangent of the wall at the mounting position in flow direction of a slurry in the at least one transfer line;
wherein the valve piston of the at least one withdrawal valve comprises a valve plate at an end directed to the at least one transfer line, the valve plate being shaped according to an inner wall of the at least one transfer line such that the valve piston is flush with the inner wall of the at least one transfer line in a closed position of the withdrawal valve; and
wherein the valve piston is mounted in the valve cylinder axially rotatable such that the valve piston axially rotates by 180°, when being moved from the closed position to a fully open position; and
transferring the withdrawn liquid slurry via a withdrawal conduit connected to the at least one withdrawal valve at an angle $\beta$ of more than 90° and less than 180°, determined from the longitudinal axis of the withdrawal valve in flow direction of the withdrawn slurry.

17. The method of claim 16, wherein the angle $\alpha$ is equal to or more than 15° to equal to or less than 70°.

18. The method of claim 16, wherein the angle $\alpha$ is equal to or more than 30° to equal to or less than 55°.

19. The method of claim 16, wherein the angle $\alpha$ is equal to or more than 40° to equal to or less than 50°.

20. The method of claim 16, wherein the angle $\beta$ is equal to or more than 110° to equal to or less than 160°.

* * * * *